(12) United States Patent
Miller

(10) Patent No.: US 12,548,475 B2
(45) Date of Patent: Feb. 10, 2026

(54) CODE-SHIELD LABEL

(71) Applicant: Platinum Press, Inc., Fort Worth, TX (US)

(72) Inventor: Tom Miller, Fort Worth, TX (US)

(73) Assignee: Platinum Press, Inc., Fort Worth, TX (US)

( * ) Notice: Subject to any disclaimer, the term of this patent is extended or adjusted under 35 U.S.C. 154(b) by 114 days.

(21) Appl. No.: 18/122,584

(22) Filed: Mar. 16, 2023

(65) Prior Publication Data
US 2023/0222946 A1 Jul. 13, 2023

Related U.S. Application Data

(62) Division of application No. 17/098,047, filed on Nov. 13, 2020, now Pat. No. 11,610,515.

(51) Int. Cl.
| | | |
|---|---|---|
| *B29C 65/00* | (2006.01) | |
| *B32B 7/12* | (2006.01) | |
| *B32B 27/06* | (2006.01) | |
| *B32B 37/00* | (2006.01) | |
| *B32B 37/12* | (2006.01) | |

(Continued)

(52) U.S. Cl.
CPC ............. *G09F 3/0297* (2013.01); *B32B 7/12* (2013.01); *B32B 27/06* (2013.01); *B32B 37/0053* (2013.01); *B32B 37/12* (2013.01); *B32B 38/0004* (2013.01); *B32B 38/10* (2013.01); *B32B 38/145* (2013.01); *B32B 38/1808* (2013.01); *B65C 3/08* (2013.01); *B65C 9/0065* (2013.01); *B65C 9/1803* (2013.01); *B65C 9/30* (2013.01); *B65C 9/46* (2013.01); *G09F 3/0288* (2013.01); *G09F 3/10* (2013.01); *B29C 65/48* (2013.01); *B29C 65/7832* (2013.01); *B29C 66/306* (2013.01); *B29C 66/4322* (2013.01); *B32B 2307/41* (2013.01); *B32B 2307/412* (2013.01); *B32B 2307/75* (2013.01); *B32B 2309/70* (2013.01); *B32B 2405/00* (2013.01); *B32B 2519/00* (2013.01);

(Continued)

(58) Field of Classification Search
CPC ... B29C 65/48; B29C 65/7832; B29C 66/306; B29C 66/4322
See application file for complete search history.

(56) References Cited

U.S. PATENT DOCUMENTS

| | | |
|---|---|---|
| 6,349,974 B1 | 2/2002 | Grosskopf |
| 2001/0052386 A1 | 12/2001 | Treleaven |

(Continued)

OTHER PUBLICATIONS

Canadian Office Action for related application No. 3,196,616, mailed Jun. 26, 2024, 5 pages.

(Continued)

*Primary Examiner* — Philip C Tucker
*Assistant Examiner* — Nickolas R Harm
(74) *Attorney, Agent, or Firm* — Lathrop GPM LLP

(57) ABSTRACT

A label including a first strip including a first end and a second end opposite the first end. The first strip includes an opaque material. The first strip further includes a first area proximate the first end. The first area includes a first length along a longitudinal axis common to the first strip. The label also includes a second strip including a third end and a fourth end opposite the third end, wherein the second strip includes a transparent material. The second strip is laminated over the first strip such that the third end is disposed outside the first area. The fourth end extends beyond the second end a distance at least equal to the first length.

11 Claims, 11 Drawing Sheets

(51) Int. Cl.
  *B32B 38/00* (2006.01)
  *B32B 38/10* (2006.01)
  *B32B 38/18* (2006.01)
  *B65C 3/08* (2006.01)
  *B65C 9/00* (2006.01)
  *B65C 9/18* (2006.01)
  *B65C 9/30* (2006.01)
  *B65C 9/46* (2006.01)
  *G09F 3/00* (2006.01)
  *G09F 3/02* (2006.01)
  *G09F 3/10* (2006.01)
  *B29C 65/48* (2006.01)
  *B29C 65/78* (2006.01)

(52) U.S. Cl.
  CPC ............... *B65C 2009/1834* (2013.01); *G09F 2003/0201* (2013.01); *G09F 2003/0229* (2013.01); *G09F 2003/023* (2013.01); *G09F 2003/0251* (2013.01); *G09F 2003/0255* (2013.01); *G09F 2003/0257* (2013.01); *G09F 2003/0273* (2013.01)

(56) References Cited

U.S. PATENT DOCUMENTS

| | | |
|---|---|---|
| 2006/0029761 A1 | 2/2006 | Matthews |
| 2006/0057313 A1 | 3/2006 | Moosheimer |
| 2011/0304132 A1 | 12/2011 | Keeney |
| 2019/0351640 A1 | 11/2019 | Green |
| 2020/0172281 A1 | 6/2020 | Matsuoka |

OTHER PUBLICATIONS

Australian Examination Report No. 2 for related application No. 2021379747, mailed Jul. 31, 2024, 4 pages.

Australian Notice of Acceptance for Patent Application for related application No. 2021379747, mailed Dec. 11, 2024, 3 pages.

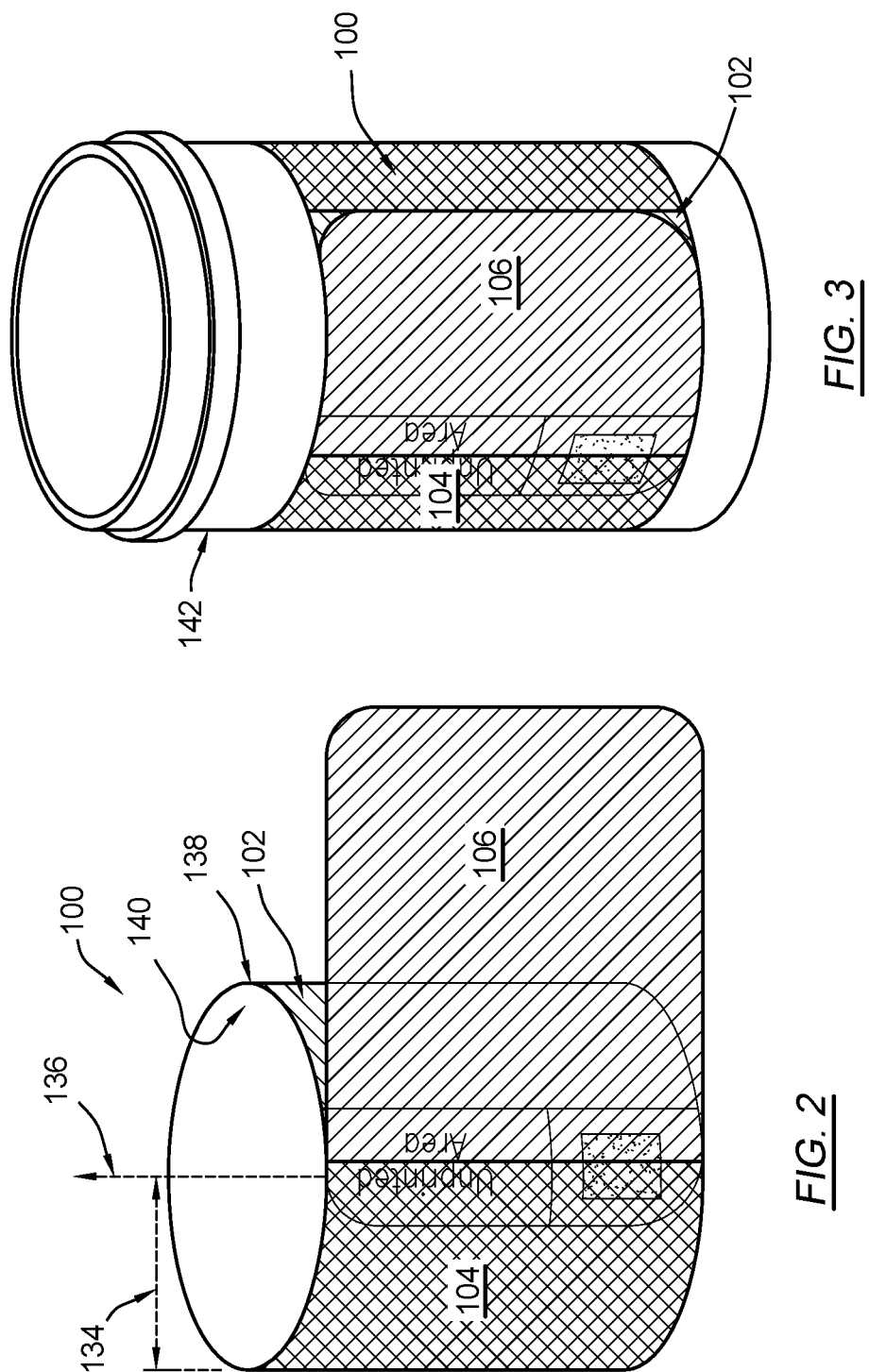

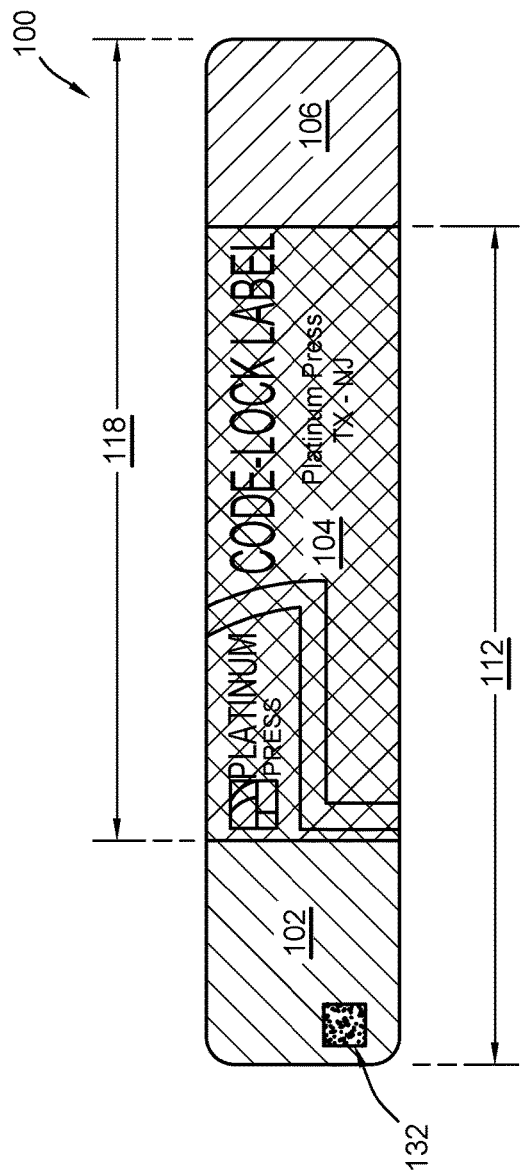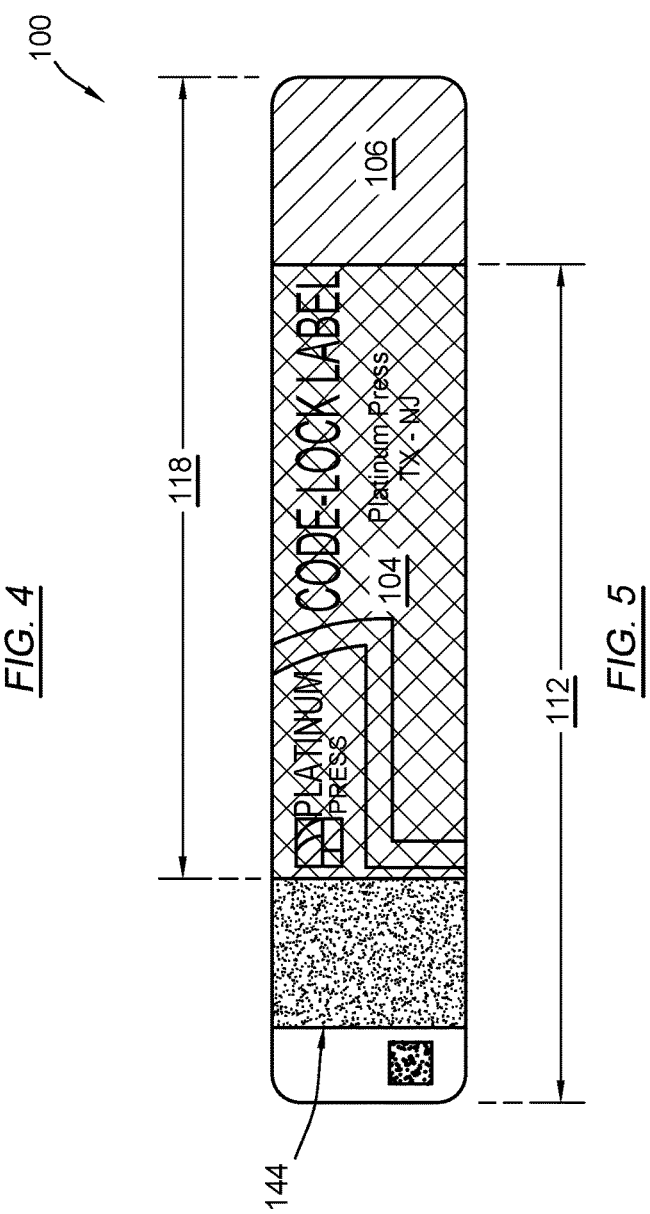

CODE-SHIELD LABEL

CROSS-REFERENCE TO RELATED APPLICATIONS

This application claims benefit under 35 U.S.C. § 120 as a divisional of U.S. patent application Ser. No. 17/098,047 filed on Nov. 30, 2020, and entitled, "CODE-SHIELD LABEL," which is incorporated herein by reference in their entirety.

BACKGROUND

Labels are commonly applied to containers to identify intended contents and other information. For example, in the case of pharmaceutical bottles or packaging, many thousands of labels may be printed for application to a like number of containers.

SUMMARY

The one or more embodiments provide for a label. The label includes a first strip including a first end and a second end opposite the first end. The first strip includes an opaque material. The first strip further includes a first area proximate the first end. The first area includes a first length along a longitudinal axis common to the first strip. The label also includes a second strip including a third end and a fourth end opposite the third end, wherein the second strip includes a transparent material. The second strip is laminated over the first strip such that the third end is disposed outside the first area. The fourth end extends beyond the second end a distance at least equal to the first length.

The one or more embodiments also provide for a method of applying a label to a container. The method includes applying a first strip around the container. The first strip includes an opaque material that makes up the label. The first strip further includes a first area proximate the first end. The first area includes a first length along a longitudinal axis common to the first strip. A second strip includes a third end and a fourth end opposite the third end. The second strip is laminated over the first strip such that the third end is disposed outside the first area. The second strip includes a transparent material. The fourth end extends past the second end a distance at least equal to the first length. The method also includes wrapping the fourth end of the second strip around the container such that the fourth end of the second strip at least partially overlays the first area of the first strip.

The one or more embodiments also provide for a device. The device includes a holding roller configured to hold a web of stock. The device also includes a drive assembly includes rollers and drive shafts configured to drive the web of stock through the device. The device also includes print modules configured to print a writing substance on the web of stock while the web of stock is driven. The device also includes a first die cut module configured to cut a first cut to the web of stock. The first die cut module is configured to cut the web of stock into strips including first lengths having corresponding first ends, corresponding second ends opposite the first ends, and corresponding areas having first lengths proximate the first ends. The first die cut module is further configured to output a first cut web of stock. The device also includes a take-up roller rotatably connected to a second drive shaft. The second drive shaft is configured to rotate the take-up roller. The take-up roller is configured to hold a web of transparent laminate. The device also includes second die cutting module configured to laminate the web of transparent laminate over the first cut web of stock outside of the first areas, wherein the adhesive module is further configured to output a laminated web. The device also includes a third die cutting module configured to cut the laminated web into strips such that, for each of the strips, second lengths of the transparent laminate extend beyond the second ends second distances at least equal to the first distances.

Other aspects of the invention will be apparent from the following description and the appended claims.

BRIEF DESCRIPTION OF DRAWINGS

FIG. 1, FIG. 2, FIG. 3, FIG. 4, and FIG. 5 show examples of labels, in accordance with one or more embodiments.

DETAILED DESCRIPTION

Figure 1:
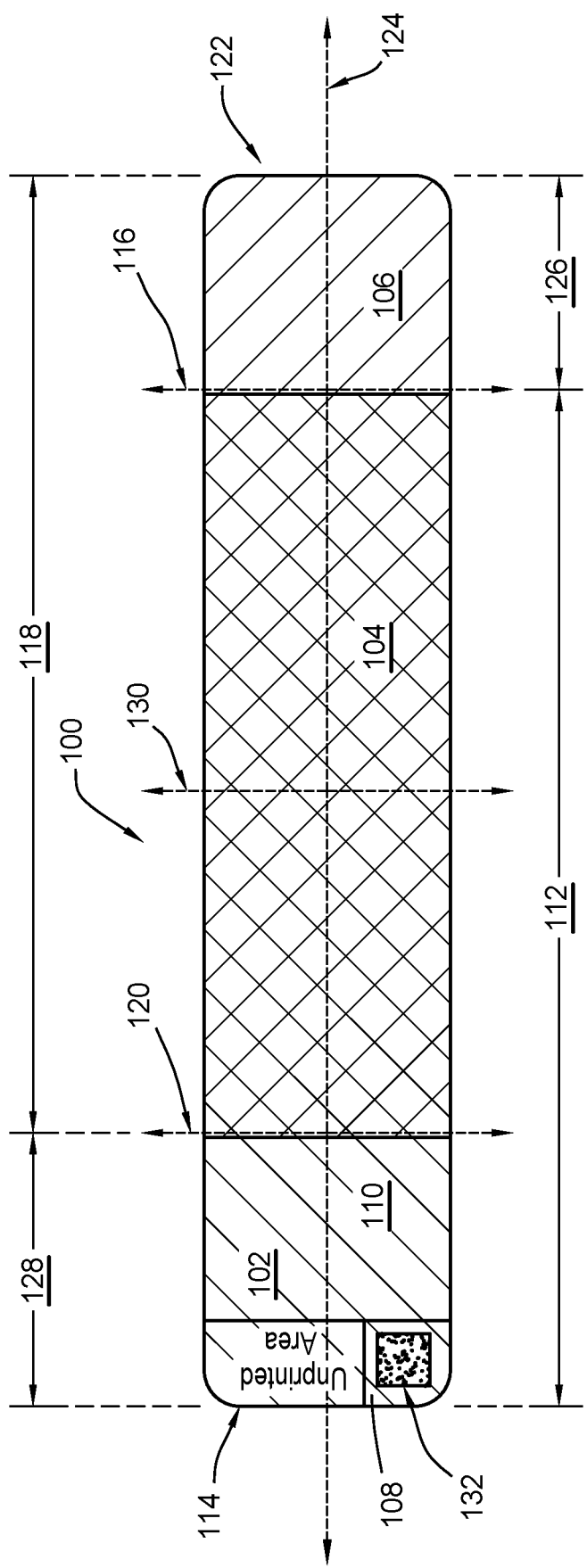

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The terms "about" or "substantially," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the terms "about" or "substantially."

In general, embodiments of the invention relate to improved labels, and more particularly the protection of lot, expiration date, and serialization of labels for application to containers. As used herein, the term "label" is defined as "a slip of paper, film, or other material, marked or inscribed, for attachment to something to indicate its manufacturer, nature, ownership, destination, etc." In one example, the one or more embodiments relate to labels for application to a cylindrical container, such as, but not limited to, a pharmaceutical bottle. More particularly, the one or more embodiments are directed at labels that solve an issue of a need for re-printing on labels while still protecting the writing on the labels with a transparent overlaminate. In some instances, one label maker will make generically applicable labels in bulk on a continuous roll of a stock of paper or other printed material, known as a web. For example, in the first printing pass, the name and information regarding a pharmaceutical customer may be printed for the labels on the web. The web may be then retained for a more specific printing. To continue the example, in a second printing pass on the web, specific information relating to a particular product (e.g., pharmaceutical name, expiration date, etc.) may be printed on a different portion of some of the labels. In some cases, the two printing passes are performed by two different companies, with the first printing company responsible for printing the generic printing and the overlaminate that protects the ink or other printed material from being smudged. However, printing cannot or should not occur on the overlaminate itself. Thus, a portion of the label may remain unprotected by the overlaminate in order to accommodate the second printing run. Unfortunately, the ink or other printed material on the unlaminated portion of the labels may be damaged, smudged, rendered unreadable, etc., which may not be considered acceptable. Thus, the one or more embodiments address this issue by providing an extended overlaminated portion which is wrappable over the other side of the labels when the labels are actually applied to containers. Because the extended overlaminated portion protects the unlaminated portion after wrapping the label around the container, the label may be termed a "Code-Shield label."

FIG. 1, FIG. 2, FIG. 3, FIG. 4, and FIG. 5 show examples of labels, in accordance with one or more embodiments. FIG. 1 through FIG. 3 should be considered together as one example of a label of the one or more embodiments, and thus share common reference numerals. Likewise, FIG. 4 and FIG. 5 should be considered together as another example of a label of the one or more embodiments, and thus share common reference numerals.

FIG. 1 shows a label (100). The label (100) may be viewed as having a first area (102), a second area (104), and a third area (106). The first area (102) may be viewed as having a first sub-area (108) and a second sub area (110). Each area may be part of one of multiple layers that compose the label (100). Thus, not all of the areas are necessarily part of one continuous material, and some areas may be composed of multiple layers of material.

In particular, the first area (102) and the second area (104) may form a strip of stock. The strip stock may be composed of one or more layers of a stock. As used herein, "stock" is a material upon which a writing substance may be lain. Stock may be paper or other material suitable for a writing medium. Thus, the stock may be an opaque material. As used herein, the term "opaque" is defined as a material which substantially does not allow light to pass through; i.e., substantially not translucent and substantially not transparent. The stock may be white, but could be of many different colors. Additionally, while opaque in some embodiments, the stock could be composed of translucent or even transparent material.

In turn, a "writing substance" is ink, thermographic material, or other material suitable for imposing alphanumeric characters or various images on the stock. A "writing substance" could also include the stock itself, such as when a laser or heating element is used to burn alphanumeric characters or various images into the stock. The writing substance may be removable from the strip of stock (112). For example, the writing substance may be subject to scratching, wear, etc., particularly after all printing runs have been completed. Ultimately, as shown in FIG. 2 and FIG. 3, the transparent laminate of the third area (106) will protect most or all areas of the strip of stock (102), preventing the writing material from being removed from the strip of stock (102).

In one exemplary embodiment, the first area (102) and the second area (104) are one continuous layer of stock forming a continuous strip of stock (112) having a first end (114) and a second end (116). The first end (114) may be one terminal end of the label (100). As used herein, the term "end," when referring to a physical object, refers to the terminal edge of the object. The term "end" may also contemplate portions of the object substantially adjacent to the terminal edge of the object.

In other embodiments, the first area (102) and/or the second area (104) may be different, possibly multiple or overlapping layers of stock. More or fewer layers of stock may be present relative to what is shown in FIG. 1.

In an embodiment, a transparent overlaminate is laid over the second area (104) and extends past the stock that composes the first area (102) and the second area (104). Thus, the third area (106) may be composed solely of the transparent overlaminate layer. The transparent overlaminate may be composed of a variety of thermoplastic materials. Example materials include, but are not limited to, poly(methyl methacrylate) (PMMA), bi-axially oriented polypropylene (BOPP), or various polycarbonates.

In an embodiment, the transparent overlaminate forms a single overlaminate strip (118) having a third end (120) and a fourth end (122). The fourth end (122) may form another terminal end of the label (100). The overlaminate strip (118) may cover the second area (104) and also form the third area (106). As can be seen in FIG. 1, the fourth end (122) may extend past the second end (116) a distance at least equal to a length of the first area (102).

The strip of stock (112) and the overlaminate strip (118) may share a longitudinal axis (124). Thus, the label may be considered to have a single longitudinal axis (124).

The third area (106) may have a first length (126) along the longitudinal axis (124). A "length", as used in this context, is defined as a section of an area having a defined physical dimension in space along the specified axis. The first length (126) may be at least equal to a second length (128), along the longitudinal axis (124), of the first area (102). However, the first length (126) may be varied. For example, the first length (126) of the third area (106) may be at least equal to another length of the first sub-area (108)

along the longitudinal axis (124), or may cover some or all of either the first sub-area (108) or the second sub area (110). While the first length (126) of the third area (106) may be varied, one possible purpose of the overlaminate strip (118) is to protect at least a portion of the first area (102) after the label (100) is ultimately applied to a container.

In the above embodiment, the transparent overlaminate strip (118) is a single strip which entirely overlaps the second area (104) and which forms the sole layer of the third area (106), but which lies outside the first area (102). In other embodiments, the transparent overlaminate may be multiple layers or multiple strips of transparent material.

Overall, the label (100) may be rectangular in shape, as shown in FIG. 1. However, the label (100) may have a variety of different shapes. Nevertheless, in an embodiment, the third area (106) should be shaped similarly to the first area (102) in order for the third area (106) to be able to overlap the first area (102).

Viewing the label (100) as a whole, the first area (102) is proximate the first end (114) (which corresponds to an overall end of the label (100)). Likewise, the third area (106) is proximate the fourth end (122) (which corresponds to an opposing overall end of the label (100)). The term "proximate" means closer to one end than the other end, relative to a central axis (130) of the label (100).

In one specific embodiment, which does not limit other embodiments, the label (100) may have the following dimensions, all of which are taken relative to the longitudinal axis (124) with respect to length and relative to the central axis (130) with respect to width. The first area may have a length of 0.7656 inches. The first sub-area (108) may have a length of 0.2565 inches. The second sub area (110) may have a length of 0.5 inches. The second area (104) may have a length of 2.056 inches. Thus, the overall length of the strip of stock (112) may be 2.8125 inches. The length of the third area (106) may be 0.6159 inches. The overlaminate covers only the second area (104) and creates the third area (106), such that the overall length of the overlaminate strip (118) is 2.6719 inches. The grand total length of the label (100), thus, may be 3.4284 inches. The width of the strip along central axis central axis (116) may be a uniform 0.6675 inches for both the strip of stock (112) and the overlaminate strip (118).

In the above embodiment, a matrix bar code (132) may be printed in a portion of the first sub-area (108). The second sub area (110) may initially remain blank, in anticipation of sending the label (100) through a second print run in which other images or text may be printed on the second sub area (110) and/or other portions of the first sub-area (108). The second area (104) may be initially printed, or may reserve some or all of sub-areas within the second area (104) for future printings. In an embodiment, the third area (106) remains a transparent area of overlaminate material during all printing processes.

Although not shown in FIG. 1, one side of the label (100) may be attached to a release strip upon which the strip of stock (112) is lain and upon which the third area (106) of the overlaminate strip (118) is lain. The release strip would be "under" the label (100) when the label (100) is viewed from above, as shown in FIG. 1. The release strip may reinforce the label (100) prior to application, and may also serve to protect an adhesive layer applied to the side of the label (100) facing the release strip. The release strip and the adhesive layer are shown in FIG. 2. The opposite side of the label (100) is the side shown in FIG. 1.

FIG. 2 shows another view of the label (100) in which the label (100) has been wrapped around itself to form a cylindrical shape having a radius (134) and a longitudinal axis (136). The height of the label (100) along the longitudinal axis (136) corresponds to the width of the label (100) along the central axis (130) shown in FIG. 1. The radius (134) may be varied depending on a degree to which one end of the label (100) overlaps the opposing end. However, the length of the label (100) may be selected such that, after the third area (106) is wrapped around to overlap the first area (102), the radius (134) will correspond to a known radius of a container upon which the label (100) is intended to be placed. To show this intent, the third area (106) is shown as a tab in FIG. 2, not yet wrapped around onto the first area (102) of the label (100).

The perspective of FIG. 2 also allows the adhesive layer (138) and the release sheet (140) to be viewed. The release sheet (140) is composed of a material to which the adhesive of the adhesive layer (138) does not adhere strongly. In an embodiment, "does not adhere strongly" means that a machine or a Human may remove the release sheet (140) from the label (100) and the adhesive layer (138) without damaging the label (100).

FIG. 3 shows another perspective of the label (100) fully applied to a container (142). In particular, FIG. 3 shows the label (100) after the third area (106) in FIG. 2 is wrapped around the first area (102).

FIG. 3 shows small corners of the first area (102) exposed after wrapping the third area (106) over the first area (102). However, in different embodiments, the third area (106) may completely overlap the first area (102) or may even extend into the second area (104) so that a portion of the overlaminate strip (118) (see FIG. 1), overlaps itself. In the latter case, the adhesive layer (138) (see FIG. 2), may not be present, as electrostatic forces, surface tension, or friction may bind the overlaminate strip (118) (see FIG. 1), to itself to hold the label (100) in place around the container (142). The term "around the container" is defined as the label at least partially wrapping around the container (142) such that the third area (106) at least partially overlaps the first area (102). In an embodiment, "around the container" includes the third area (106) completely covering the first area (102), or an end of the third area (106) wrapping over and past the first area (102) onto the second area (104).

In any case, the overlaminate strip (118) (see FIG. 1), substantially protects any writing that may have been applied to the first area (102) or the second area (104). The term "substantially protects" means that the overlaminate strip (118) (see FIG. 1), resists or prevents the writing substance from being removed, smudged, scratched, etc. from the strip of stock (112) (see FIG. 1).

However, because the overlaminate strip (118) (see FIG. 1), did not initially completely overlap the strip of stock (112) (see FIG. 1), the first area (102) was left available for additional printing runs after application of the overlaminate strip (118) (see FIG. 1). Thus, for example, a printer could print generically applicable labels for a customer, transport the generically applicable labels to the customer, whereupon the customer will print on the first area (102) to include specific information, and then apply the labels to the containers. Alternatively, the printer could perform both print runs. In an embodiment, a long web of pre-printed labels could be produced, and then in a second print run the first area (102) of each single label could be printed with information specific to each single label. In any case, when a label is actually removed from the web and applied to a container such as container (142), then the third area (106) wraps around and protects the first area (102).

FIG. 4 and FIG. 5 show specific examples of pre-printed labels, as described above. The labels shown in FIG. 4 and FIG. 5 may be the same labels shown in FIG. 1 through FIG. 3. Thus, FIG. 4 and FIG. 5 share reference numerals in common with FIG. 1 through FIG. 3.

The label (100) shown in FIG. 4 shows pre-printed material in second area (104) that will be common to all labels for a particular print run. The matrix bar code (132) may relay additional information common to all of the print runs, such as a phone number or other information relating to the printer. The first area (102) is left blank in this embodiment, possibly for additional print runs.

The label (100) shown in FIG. 5 is similar to the label (100) shown in FIG. 4. However, in this case, a thermographic or flexographic material (144) has been printed on the second sub area (110) of the first area (102). The thermographic or flexographic material (144) may be termed "solid". In this context, the term "solid" means "completely covers" an area in which the material is placed. In an embodiment, the label (100) will be shipped to a customer, who will use a thermographic printer or laser etcher to print on the thermographic or flexographic material (144).

Note that many thermographic materials are easily smudged or damaged, even by a light touch by a Human finger. Thus, after subsequent printing on the thermographic or flexographic material (144) and further after the label (100) is applied to a container (142), the third area (106) of the overlaminate strip (118) will protect the thermographic or flexographic material (144) from such smudges or damage. In this manner, printed material on the thermographic or flexographic material (144) will be preserved or at least resist smudges or damage.

FIG. 6, FIG. 7, FIG. 8, and FIG. 9 show stages of cutting and laminating a web of stock to produce a sheet of labels, in accordance with one or more embodiments. Thus, FIG. 6 through FIG. 9 share common reference numerals. The labels shown in FIG. 9 may correspond to the labels shown in FIG. 1 through FIG. 5

Figure 6:
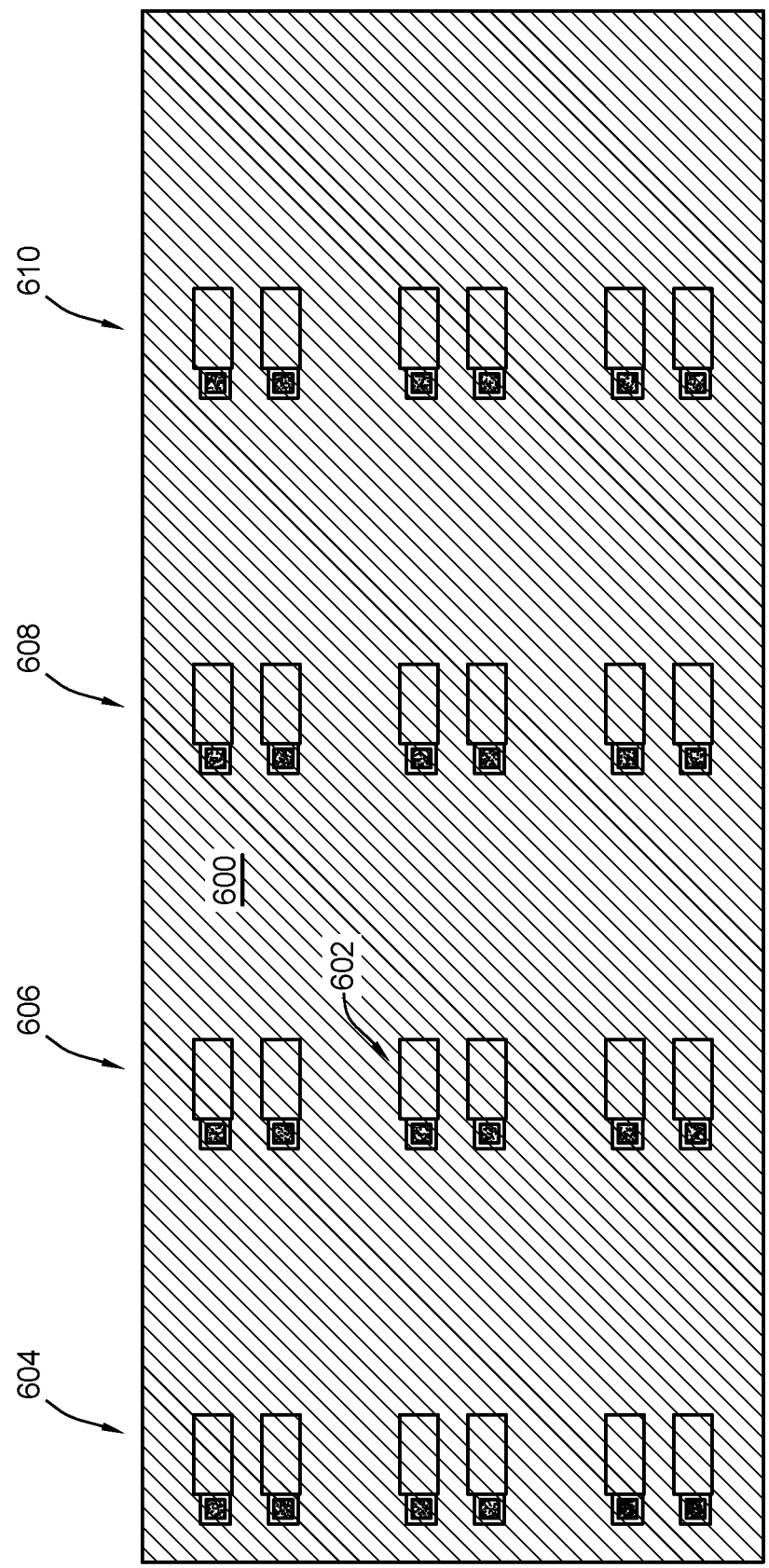
FIG. 6, FIG. 7, FIG. 8, and FIG. 9 show a web of stock to produce a sheet of labels, in accordance with one or more embodiments.

FIG. 6 shows a web of stock (600). The web of stock (600) is disposed on a liner layer under the web of stock (600). The liner layer is shown in FIG. 7.

Figure 10:
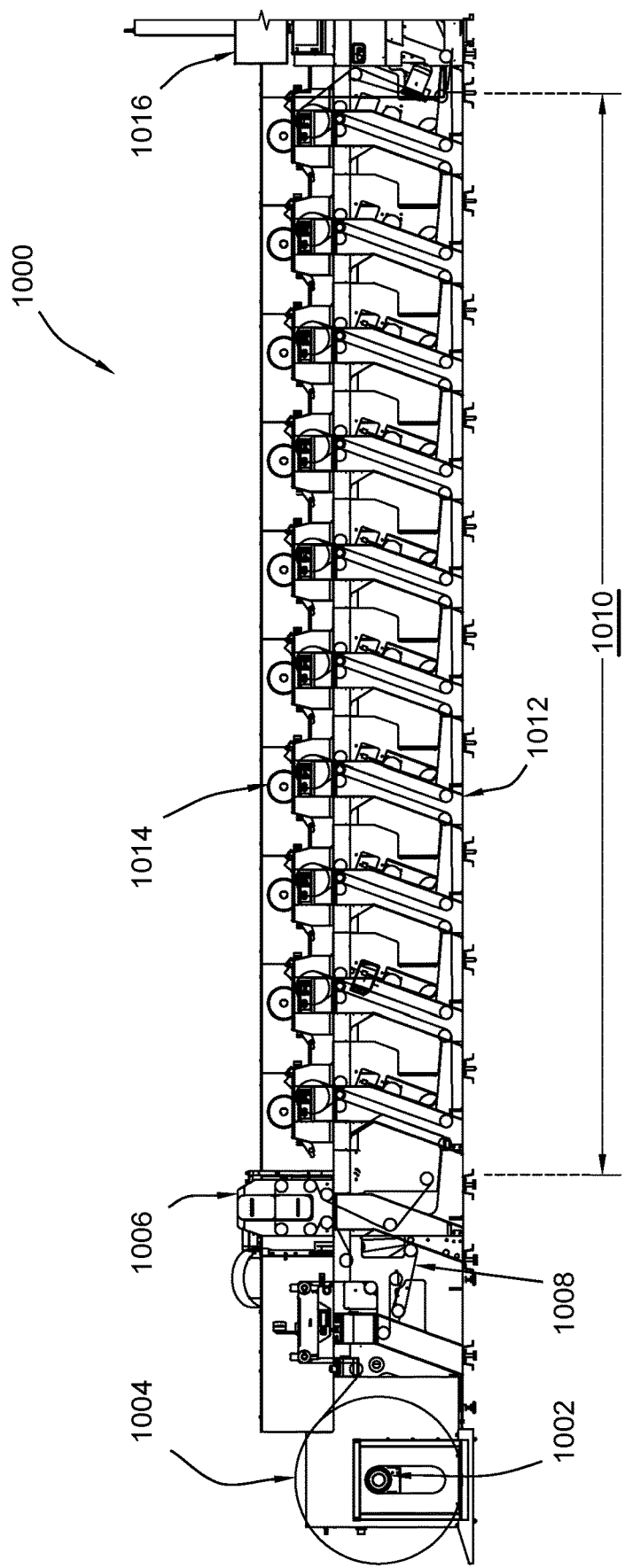
FIG. 10, FIG. 11, and FIG. 12 show a modified printing machine configured to print the labels shown in FIG. 1 through FIG. 5 in accordance with the procedures described with respect to FIG. 6 through FIG. 9, in accordance with one or more embodiments.
Figure 11:
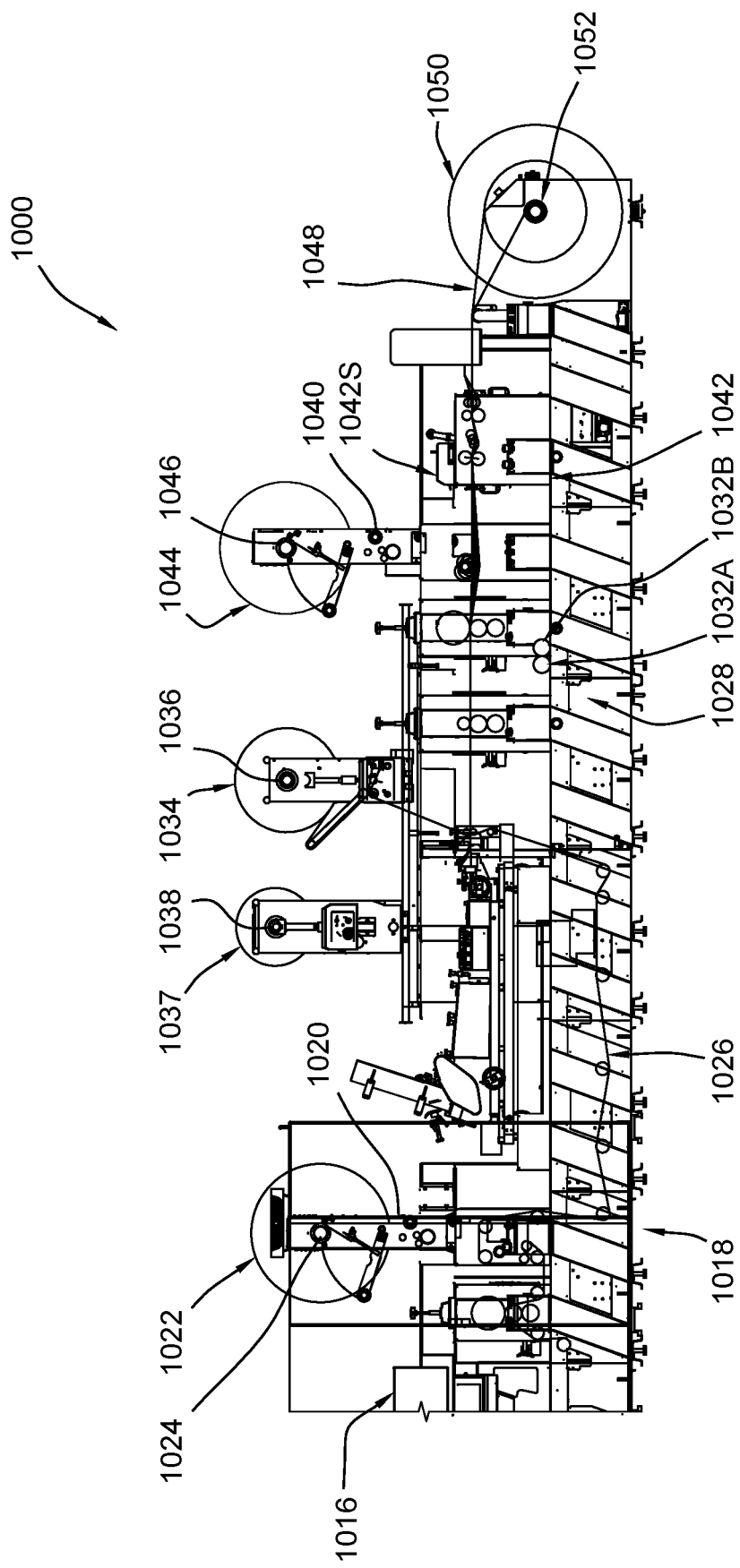
Figure 12:
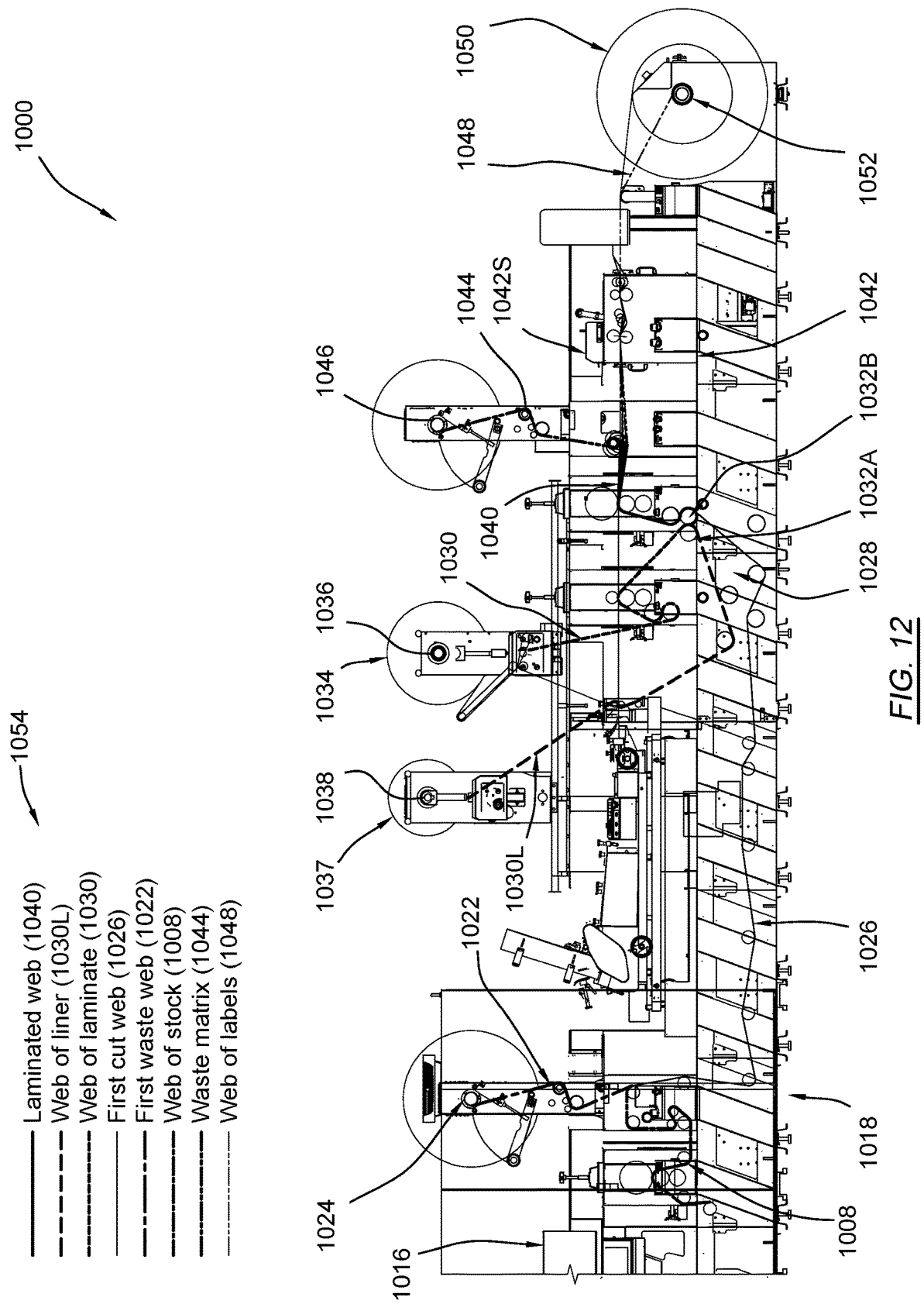

Initial labels, such as initial label (602), are printed in rows and columns on the web of stock (600) using a printing machine, such as the printing machine shown in FIG. 10 through FIG. 12. The embodiment shown in FIG. 6 includes four columns of printed material, including first column (604), second column (606), third column (608), and fourth column (610). The embodiment shown in FIG. 6 also includes six rows of printed material, arranged in pairs as shown. In an embodiment, the web of stock (600) is part of a much larger, continuous roll of stock with many more columns and rows of printed material. In an embodiment, the arrangement, size, and nature of the printed material may be varied from that shown in FIG. 6.

Figure 7:
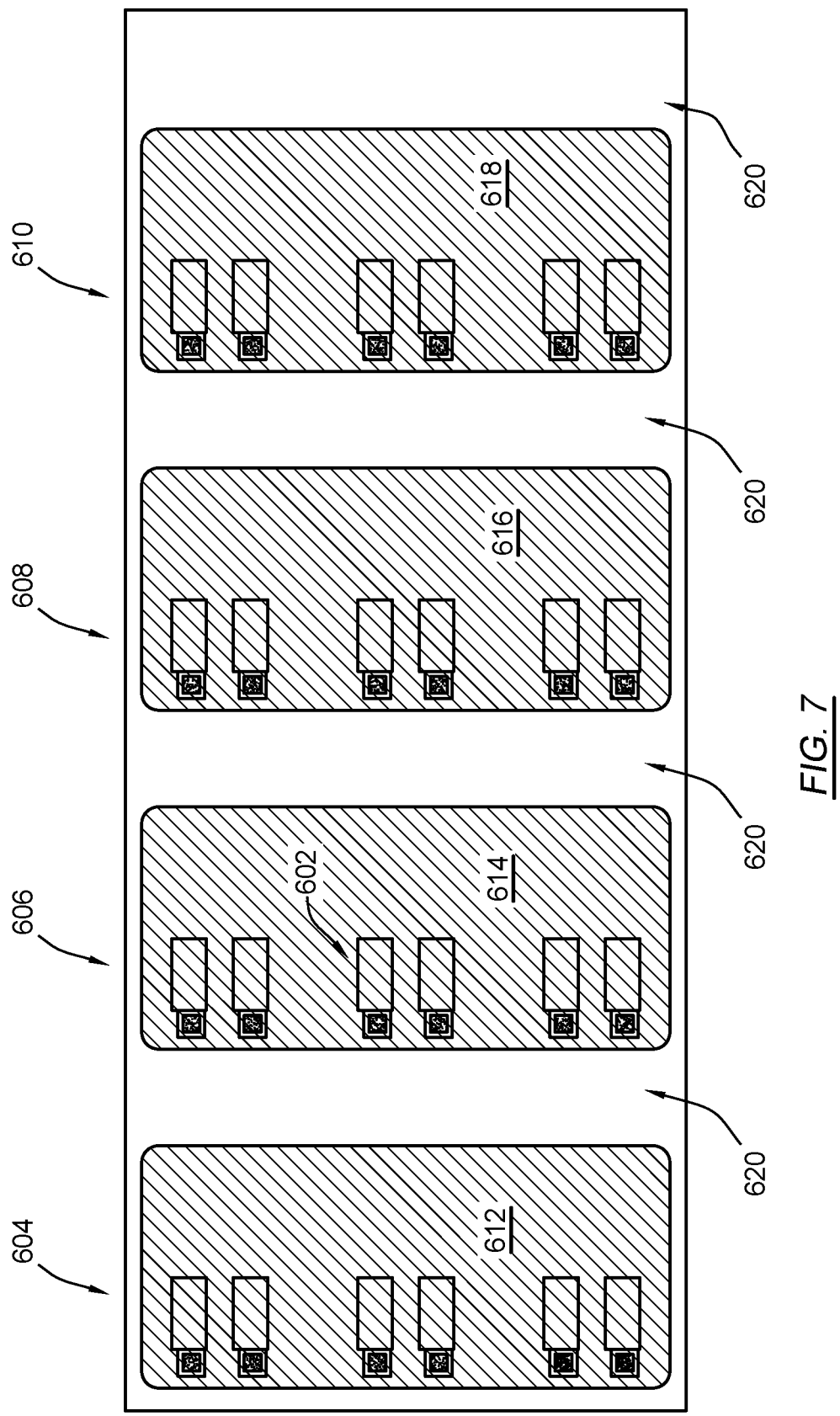

FIG. 7 shows the results of an initial cut and strip operation in a printing machine, such as the printing machine shown in FIG. 10 through FIG. 12. The web of stock (600) has been cut into sections, including first section (612), second section (614), third section (616), and fourth section (618).

The remainder of the web of stock (600) is stripped away using a take-up roller of the printing machine, thereby revealing the liner (620) underlying the web of stock (600). The liner (620) is shown in several different locations in FIG. 7 to highlight where the liner (620) is located. Initial label (602) in the second column (606) is shown for reference.

For additional clarity, two hash patterns are shown for different areas in FIG. 7. A first hash pattern is used in first section (612), second section (614), third section (616), and fourth section (618). The first hash pattern indicates sections of the web of stock (600) that remain. A second hash pattern is used in the areas outside of the first section (612), second section (614), third section (616), and fourth section (618). The second hash pattern indicates the presence of the liner (620) underlying the web of stock (600), as shown by the multiple arrows leading from reference numeral (620) in FIG. 7.

Figure 8:
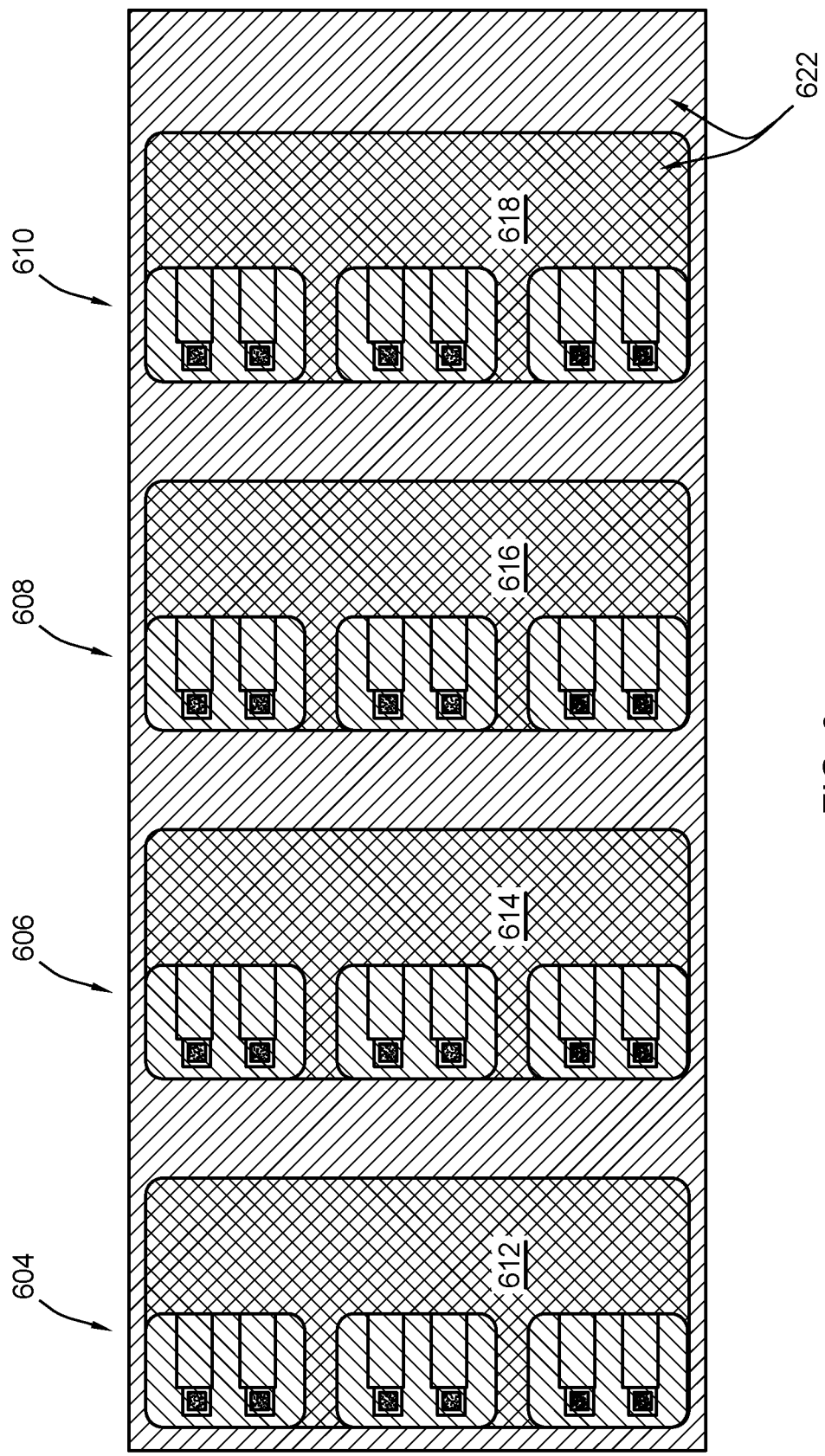

FIG. 8 shows a laminate material (622) that is laminated onto both the remaining portions of the web of stock (600) and the liner (620), as indicated by the multiple arrows leading from reference numeral (622). Thus, the laminate material (622) is disposed over all of the first section (612), second section (614), third section (616), and fourth section (618) of the remaining sections of the web of stock (600), as well as the initial labels such as initial label (602), as well as over the various areas of the liner (see liner (620) in FIG. 7). The laminate is transparent, and thus all of the other layers are still visible in FIG. 8. However, had the laminate been opaque, then the other layers would not have been visible in FIG. 8.

In an embodiment, a continuous layer of laminate material (622) need not be applied. Instead, the laminate material (622) might only be applied to those area outside of the first section (612), second section (614), third section (616), fourth section (618), and other sections of the web of stock (600).

Figure 9:
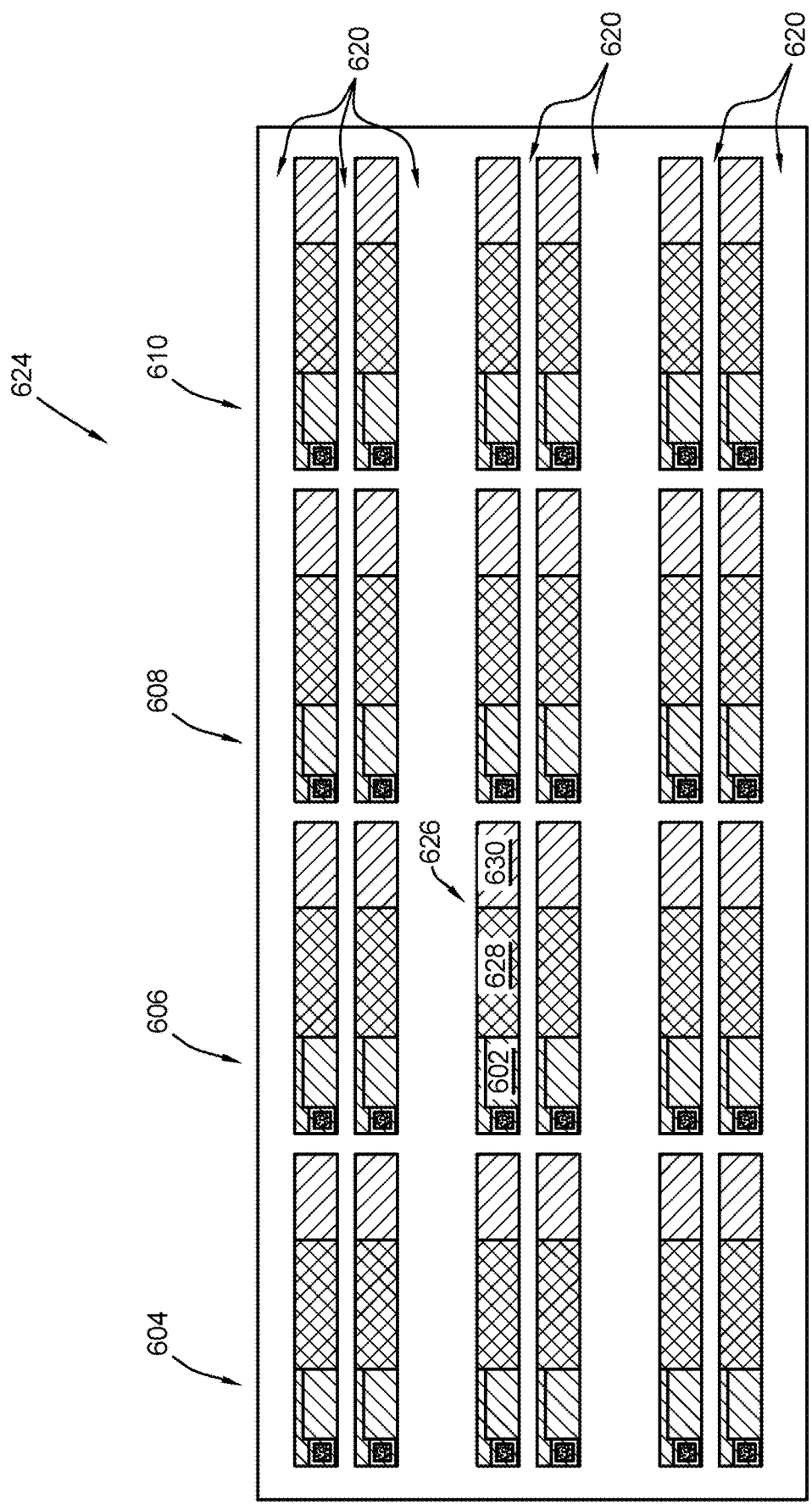

FIG. 9 shows a web of labels (624), such as label (626), arranged in columns and row. The web of labels (624) is formed by performing another cut and strip operation using the printing machine shown in FIG. 10 through FIG. 13.

Specifically, portion of the laminate material and portions of the remaining sections of stock are cut and stripped from the liner (620), which is once again visible in FIG. 9, as shown from the multiple arrows leading from reference numeral (620). Thus, the laminate material laminate material (622), if applied to the areas of the web of stock (600), may be stripped from certain areas of the web of stock (600). Similarly, the laminate material (622) may be stripped from certain areas of the liner (620). Namely, the laminate material (622) may be stripped from the initial label (602), but allowed to remain in the remaining areas of the web of stock (600), as described below. Similarly, the laminate material (622) may be stripped from the liner (620), but allowed to remain in certain areas of laminated liner, as described below.

As a result of the final cut and strip operation, rows and columns of labels, such as label (626), are formed. The initial label (602) is uncovered by the laminate material (622). Thus, the initial label (602) is equivalent to the first area (102) shown in FIG. 1. However, the laminate material (622) remains over the other portions of the web of stock (600) that remain. Thus, an area of laminated stock (628) remains. The area of laminated stock (628) corresponds to the second area (104) shown in FIG. 1. Additionally, the laminate material (622) also remains disposed on the liner in the non-stripped portions of the web. Thus, an area of laminated liner (630) remains. The area of laminated liner (630) corresponds to the third area (106) shown in FIG. 1.

Optionally, the liner (620) and/or the web of stock (600) could have been coated with an adhesive layer. Thus, each of the labels, including label (626), may also have an adhesive layer which underlies both the web of stock that remains, as well as the portions of the laminate material that remain.

In use, the web of labels (624) may be taken up on a roller. The web of labels (624) may then be transferred to a customer, or may be fed back into the printing machine for another printing run to print material on the unlaminated portions of the labels.

Thereafter, the web of labels (624) may be further cut and sub-divided into sheets. The sheets may then be conveniently stacked and stored in boxes.

Ultimately, the labels may be removed individually from the liner (620). After removal, the labels may be applied to one or more containers or other objects.

FIG. 10, FIG. 11, and FIG. 12 show a modified printing machine configured to print the labels shown in FIG. 1 through FIG. 5 in accordance with the procedures described with respect to FIG. 6 through FIG. 9, in accordance with one or more embodiments. The printing machine (1000) is common to FIG. 10 through FIG. 12. Thus, FIG. 10 through FIG. 12 share common reference numerals. FIG. 10 and FIG. 11 show two different portions of the same printing machine (1000), and thus may be viewed side-by-side. However, FIG. 12 shows only the portion of the printing machine (1000) shown in FIG. 11, but emphasizes the path of the webs taken through the printing machine (1000).

The printing machine (1000) may be viewed as being composed of various interconnected sections which may be termed "modules." A "module" is a section of a print machine which performs a function with respect to a printing operation, or which controls the print machine. A module may be removably attached to an adjacent module, though in some cases, two modules may be integrated as one machine but still termed "modules" in order to distinguish their different functions with respect to a print operation.

Many modules may include a set of rollers which drive and guide the webs through the printing machine (1000), in which case such a module is a "drive module." A drive module may also perform other functions; thus, a "drive module" may be provided with a different name and still be considered a type of "drive module." For example, a "print module" may perform the function of printing on a web of stock, but also be considered a "drive module" because the "print module" also drives the web of stock to the next module. Unless stated otherwise, any named module may be assumed to also be a "drive module" in at least one embodiment, unless explicitly stated otherwise.

For drive modules, a drive assembly performs the mechanical action needed to perform this action. A drive assembly is defined as a motor and a mechanical connection that connects the motor directly or indirectly to a part being rotated or driven, such as a roller.

As an example of a "mechanical connection", drive modules may include drive shafts which drive the rollers via an intervening mechanical connection to the motor. The various drive shafts may be connected to a common motor or drive mechanism. Alternatively, each drive module may have its own set of drive shafts and motors, or some combination thereof. The printing machine (1000) may have other modules. Each module in the printing machine (1000) may perform multiple functions.

Returning to the definition of a "print module," a print module is defined as any module that contains a printing mechanism configured to print on a web of stock or other material. For example, a "print module" may be a print roller head driven by a motor (possibly the same motor that drives the drive assembly for the print module), an ink dispenser, and possibly a head that applies ink to a web. A "print module" may take many forms, such as one or more lasers or thermographic printing tools, print heads, print rollers, ink applicators, and many more such tools for applying a writing material onto a substrate.

A "die cut module" is defined as a module that accommodates one or more blades, rotary cutting dies, strippers, or other cutting implements which are configured to cut and/or strip material from the web of stock, a liner on which the web of stock is placed, and/or one or more laminating layers placed over the web of stock. The cutting implements may be passive, such as in the case of a blade placed in the path of the web of stock, or may be active, such as in the case of rotary cutting die, or a blade connected to a moveable part which moves the blade with respect to the web of stock as the web of stock moves through the module. Any moving cutting tools may be connected directly or indirectly to a motor, which might be the same motor that drives any drive shafts for a die cut module that is also a drive module.

An unwind/rewind module is defined as a module that contains rollers, applicators, presses, and/or any other tools useful for applying a laminate material onto a web of stock as the web of stock is driven through the unwind/rewind module. An unwind/rewind module may also be a drive module in many cases. As an example, an unwind/rewind module may include a laminate material holding roller, a drive shaft to drive the laminate material holding roller, a motor to drive the drive shaft, and a press which presses the laminate material fed from the laminate material holding roller onto the web of stock as the web of stock moves through the adhesive module.

A "sheeting module" is defined as a type of die cut module in which a slit is made across a web of stock in order to divide the web of stock into sheets, possibly of about equal length. Thus, a "cross-cut" is a cut that is performed entirely across a web of stock relative to a direction of travel of the web of stock through the sheeting module. A "sheeting module" may also be a drive module.

As indicated above, some modules may perform multiple functions, even more than two functions. For example, a single module could be all three of a "drive module," a "print module," and a "die cut module." As used herein, it is assumed that any module given a single name may also perform additional functions in alternative embodiments; however, if a module is given a functional name, then the module at least performs that named function using tools as described above.

Turning to the printing machine (1000) shown in FIG. 10, at one end of the printing machine (1000) is one or more stock holding rollers, such as stock holding roller (1002). The stock holding roller (1002) is a roller, possibly including a drive shaft and motor, around which is wound a roll of stock (1004). Optionally, an web cleaning accessory module (1006) may receive, guide, and clean an unwinding web of stock (1008).

From there, the web of stock (1008) is fed through one or more of a set of print modules (1010), including a print module (1012). Each print module may be similar to the print module (1012), but could be different in terms of function or components. The set of print modules (1010) may be drive modules.

As an example, in addition to rollers, drive shafts, and motors, the print module (1012) accommodates a print cylinder (1014). The print cylinder (1014) has a printing plate attached to it which applies printing to the web of stock (1008) as the web of stock (1008) passes through the print module (1012). The print cylinder (1014) may be some other type of printer, and need not be a roller. The print module (1012) may be configured to perform different types of printing, including ink printing, lithographic printing, flexographic printing, thermographic printing, or the use of lasers or heating elements to etch the web of stock (1008). In an embodiment, different ones of the set of print modules (1010) may use different printing technologies, if desired.

In an embodiment, the set of print modules (1010) print the initial labels on the web of stock (1008). Thus, for example, the set of print modules (1010) may apply the printed material shown in the first area (102) and the second area (104) shown in FIG. 1 through FIG. 5.

The printing machine (1000) may also include a command and control module (1016). The command and control module (1016) may be, but need not be, a drive module. The command and control module (1016) is connected directly or wirelessly with the other modules in the printing machine (1000). The command and control module (1016) may include a user input device, such as but not limited to a keyboard, and a display so that a user may input various commands into the command and control module (1016) to control various aspects of the printing machine (1000). The command and control module (1016) may include a computer which processes user commands and controls operation of various modules of the printing machine (1000) accordingly. In an embodiment, the command and control module (1016) may be used to individually control the operation of any of modules in the printing machine (1000), as well as to control the interaction of modules so that the printing machine (1000) may behave as a single unit.

Attention is now turned to FIG. 11, which shows additional modules connected with the modules shown in FIG. 10. For reference, the command and control module (1016) is shown again in FIG. 11. FIG. 11 shows additional modules which modify the printing machine (1000) to produce the labels shown in FIG. 1 through FIG. 5 according to the procedures described with respect to FIG. 6 through FIG. 10. Note that the description of FIG. 11 focuses on the structure and the mechanisms used in the label manufacturing procedure. However, the description of FIG. 12 focuses on the paths taken by the web of stock (1008), a laminate web, and the various waste webs through the printing machine (1000).

In an embodiment, after the last print module in the set of print modules (1010), the web of stock (1008) is fed through a first diecut module (1018). The first diecut module (1018) includes a first cut and strip mechanism (1020). The first cut and strip mechanism (1020) includes one or more blades or other cutting tools. The blade or other cutting tools may be moveable into the web of stock (1008), or alternatively the web of stock (1008) may be moved into the blade or other cutting tools.

A stripping mechanism, such as a blade shaped to match the expected sections of waste stock (or other tool) may thereafter strip the waste stock from the web of stock (1008). The waste stock forms a first waste web (1022) which is taken up by a first waste take-up roller (1024). A waste take-up roller is defined as a roller, either passively spinning or actively driven, that takes up the waste stock during production. Later, the first waste web (1022) may be recycled or disposed of.

After the first cut and take-up of the resulting waste, a first cut web (1026) is formed. The first cut web (1026) may be fed through several more drive modules, possibly to clean or orient the first cut web (1026).

The first cut web (1026) is then fed into an die cutting module (1028), which may be composed of multiple submodules. The die cutting module (1028) may include multiple rollers for driving the first cut web (1026) as well as a web of laminate (1030) and a web of liner (1030L) (see FIG. 12). The web of laminate (1030), web of liner (1030L), and the first cut web (1026) are fed together into opposing press rollers, including first press roller (1032A) and second press roller (1032B). The press rollers press (1030) against the first cut web (1026). The web of laminate (1030) is pre-cut prior to application to the first cut web (1026) in order to match the desired portions of the first cut web (1026) to be laminated.

The web of laminate (1030 & 1030L) may be stored on a roll of laminate (1034). The roll of laminate (1034) may be dispensed on laminate roller (1036). The laminate roller (1036) may be a passive roller which allows the web of laminate (1030 & 1030L) to unwind from the roll of laminate (1034), or may be a driven roller driven by a drive shaft and motor.

After the laminate (1030) is pressed to first cut web (1026) using the press roller (1032A) the web of liner (1030L) is removed to create the roll of liner (1037) disposed on or driven by a liner roller (1038).

After passing through the die cutting module (1028), a laminated web (1040) is formed. The laminated web (1040) includes the web of stock (1008) and a web of laminate (1030).

The laminated web (1040) is then passed to a third diecut module (1042). The third diecut module (1042) is a drive module that includes another blade or other tool configured to cut through the laminate layer and, if desired or necessary, though any remaining stock, without cutting through the liner layer. As with the first and second diecut modules (1018 & 1028), the blade or tool may be fixed (with the laminated web (1040) moved into the blade or tool), or the blade or tool may be moveable into the laminated web (1040).

If desirable, the third diecut module (1042) may also include a slitter (1042S). The slitter (1042S) may further slit the laminated web (1040) in order to achieve the desired size and shape of the labels.

After the cuts made by the third diecut module (1042), the waste stock and waste laminate (together known as a waste matrix (1044)) is stripped from the liner by a waste rewind. The waste rewind is a unwind/rewind module which lifts the unwanted portions of stock and laminate from the liner. The waste matrix (1044) is taken up by waste matrix take-up roller (1046), which may be driven by a motor and drive shaft.

What remains after the operation of the second diecut module (1042) is a web of labels (1048). The web of labels (1048) corresponds to the web of labels (624) shown in FIG. 9.

The web of labels (1048) may then be taken up into a roll of labels (1050) that winds around a product take-up roller (1052). The product take-up roller is defined as a roller, which either passively spins or is actively driven (possibly by a motor) upon which the products is wrapped as the web of stock exits the printing machine (1000).

From there, the roll of labels (1050) may be returned to the stock holding roller (1002) for another print run though the printing machine (1000). Alternatively, the roll of labels (1050) may be shipped to a customer for additional printing on the unlaminated areas of the labels.

Attention is now turned to FIG. 12. FIG. 12 is a duplicate of FIG. 11. However, the paths taken by the various webs described above are emphasized. Legend (1054) may be used to identify the various webs described above. Thus, for example, the web of stock (1008) passes through the first diecut module (1018), from which the first waste web (1022) is taken up. From there, the first cut web (1026) is sent to the die cutting module (1028), in which the web of laminate (1030) is pressed onto the first cut web (1026) and the waste liner (1030L) is wound onto rewind (1038) to create the waste liner roll (1037). From there, the laminated web (1040) is sent to the second diecut module (1042), from which the waste matrix (1044) is taken up, leaving the web of labels (1048) which is rolled into the roll of labels (1050). The web of labels (1048) is the result of the first pass through the printing machine (1000). As described above, additional passes may be performed through the printing machine (1000) in order to print on the unlaminated areas of the web of labels (1048).

Variations are possible. For example, more or fewer modules may be present. Additional modules added to FIG. 11 may be used to add additional layers to the web of labels (1048) prior to being taken up by the product take-up roller (1052). For example, a roll of adhesive material may be added and applied to the web of liner. After the first print run, the roll of labels (1050) may be placed on the stock holding roller (1002) and fed back through the printing machine (1000), not only for additional printing, but also possibly to add additional layers to the web of labels (1048).

Thus, while FIG. 1 through FIG. 12 may show a configuration of components, other configurations may be used without departing from the scope of the invention. For example, various components may be combined to create a single component. As another example, the functionality performed by a single component may be performed by two or more components.

Figure 13:
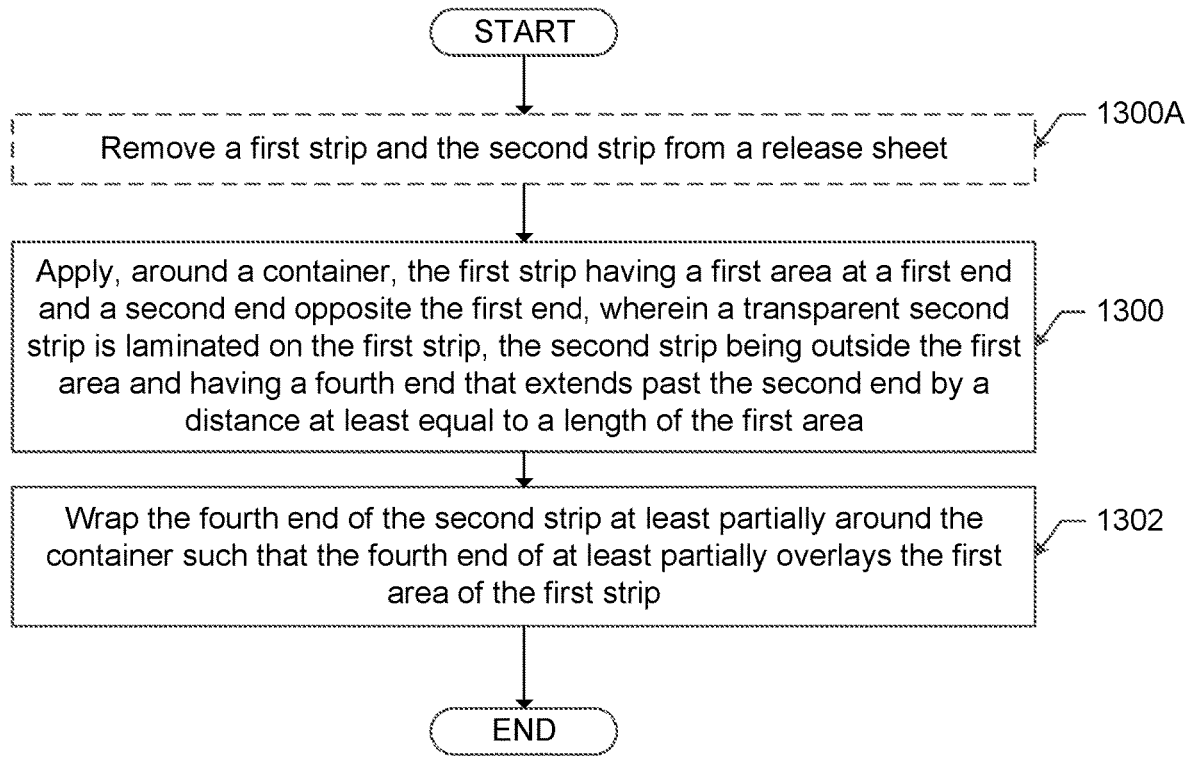
FIG. 13 shows a method for applying a label to a container, in accordance with one or more embodiments.

FIG. 13 shows a method for applying a label to a container, in accordance with one or more embodiments. The method shown in FIG. 13 may be performed using the labels shown in FIG. 1 through FIG. 5.

At step 1300, a first strip is applied around the container. As used herein, the term "strip" is defined as a section of material which may have a variety of different shapes. The first strip may be an opaque material including the label and further includes a first area proximate a first end of the first strip. The first area has a first length along a longitudinal axis common to the first strip. A second strip including a third end and a fourth end opposite the third end is laminated over the first strip such that the third end is disposed outside the first area. The term "disposed outside" is defined such that a first object is "disposed outside" a second object when none of the first object and the second object overlap. The second strip may be a transparent material. The fourth end extends past the second end a distance at least equal to the first length.

At step 1302, the fourth end of the second strip is wrapped at least partially around the container such that the fourth end of the second strip at least partially overlays the first area of the first strip. As used herein, the term "overlay" means that one portion of material covers or is directly laid on a second portion of material. An adhesive on the first strip may secure the label to the container. The adhesive on the first area may secure the fourth area of the transparent second strip to the first area of the opaque first strip. The method of FIG. 13 may terminate thereafter.

In a variation, the first strip and the fourth end of the second strip are disposed on a release sheet. The first strip and the fourth end of the second strip may further include an adhesive. In this variation, the method shown in FIG. 13 may instead begin at step 1300A, in which, prior to applying the first strip, the first strip and the second strip are removed from the release sheet.

Figure 14:
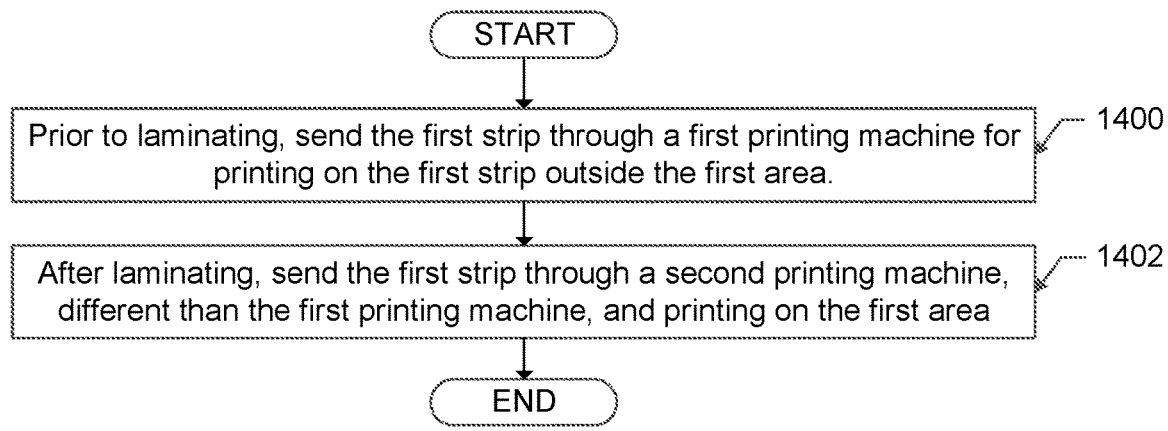
FIG. 14 shows a method for pre-processing a label to be applied to a container, as described with respect to FIG. 13, in accordance with one or more embodiments.

FIG. 14 shows a method for pre-processing a label to be applied to a container, as described with respect to FIG. 13, in accordance with one or more embodiments. In other words, the method of FIG. 14 may, in an embodiment, be considered a pre-processing method performed prior to performing the method of FIG. 13.

At step 1400, prior to laminating, the first strip is sent through a first printing machine for printing on the first strip outside the first area. Then, at step 1402, after laminating, the first strip is sent through a second printing machine, different than the first printing machine, and printing on the first area. The second printing machine may be the same printing machine (i.e. a second print run in the same printing machine), or the second printing machine may be a separate printing machine, possibly owned by a company different than the company that owns the first printing machine. The method of FIG. 14 may terminate thereafter.

In a variation, the first area includes a first sub-area and a second sub-area. The first sub-area includes a printed matrix bar code uniquely identifying a type of the label. The second sub-area includes a solid flexographic material. In this case, step 1302 may include sending the first strip through a printing machine and printing on the flexographic material.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of applying a label to a container, the method comprising:
    sending a first strip and a second strip through a first printing machine, wherein:
        the first strip comprises a first end and a second end opposite the first end,
        the first strip comprises an opaque material comprising the label,
        the first strip further comprises a first area proximate the first end,
        the first area includes a first length along a longitudinal axis common to the first strip;
        the second strip comprises a third end and a fourth end opposite the third end,
        the second strip is laminated over the first strip such that the third end is disposed outside the first area,
        the second strip comprises a transparent material, and
        the fourth end extends past the second end a first distance at least equal to the first length;

printing, by the first printing machine, on the first strip outside the first area;

sending, after printing on the first strip outside the first area, the first strip through a second printing machine, different than the first printing machine;

printing, by the second printing machine, on the first area; and applying, after sending, the first strip around the container; and wrapping the fourth end of the second strip around the container such that the fourth end of the second strip at least partially overlays the first area of the first strip.

2. The method of claim 1, wherein:
the first area comprises a first sub-area and a second sub-area,
the first area is initially blank, and
the fourth end, after wrapping, completely overlays both the first sub-area and the second sub-area.

3. The method of claim 2, wherein the first sub-area comprises a printed matrix bar code uniquely identifying a type of the label.

4. The method of claim 2, wherein the second sub-area comprises a solid flexographic material.

5. The method of claim 4, further comprising:
sending, prior to applying the first strip around the container, the first strip through a printing machine and printing on the flexographic material.

6. The method of claim 1, wherein the first area comprises a first sub-area and a second sub-area, wherein the first sub-area comprises a printed matrix bar code uniquely identifying a type of the label, wherein the second sub-area comprises a solid flexographic material, and wherein the method further comprises:

sending, prior to applying the first strip around the container, the first strip through a printing machine and printing on the solid flexographic material, and
wherein, after wrapping, the fourth end completely overlays both the first sub-area and the second sub-area.

7. The method of claim 1, wherein the first strip and the fourth end of the second strip are disposed on a release sheet, wherein the first strip and the fourth end of the second strip further comprise an adhesive, and wherein the method further comprises:
removing, prior to applying the first strip, removing the first strip and the second strip from the release sheet.

8. The method of claim 7, wherein the first strip comprises a first side and a second side, the method further comprising:
disposing an adhesive on the first side, wherein the first side of the first strip is lain upon the release sheet; and
applying a first writing substance to the second side.

9. The method of claim 1, wherein the first strip further comprises a second area between the first area and the second end, wherein printing on the first strip outside the first area further comprises:
sending the first strip through the first printing machine and printing a first writing substance on the second area, wherein at least one sub-area of the first area remains substantially blank.

10. The method of claim 9, wherein the transparent material of the second strip is selected to prevent a writing substance from being removable from the first strip.

11. The method of claim 10, wherein the label is wrapped into a cylindrical shape with the fourth end overlapping the first area and abutting the second area.

* * * * *